United States Patent Office 3,269,978
Patented August 30, 1966

---

3,269,978
DIENE POLYMERS CONTAINING BOTH TERMINAL EPOXY AND HYDROXY GROUPS
James N. Short and Robert P. Zelinski, both of Bartlesville, Okla., assignors to Phillips Petroleum Company, a corporation of Delaware
No Drawing. Filed May 22, 1961, Ser. No. 111,491
20 Claims. (Cl. 260—41.5)

This invention relates to polymers which contain terminal epoxy and hydroxy groups. In another aspect it relates to a method of preparing such polymers and to the method of reacting these polymers with polyfunctional organic compounds to form a cured product.

It has been disclosed in copending application Serial No. 772,167 of Uraneck, Short, Hsieh and Zelinski, filed November 6, 1958, that highly useful polymeric products can be obtained by polymerizing vinylidine-containing monomers in the presence of an organo alkali metal catalyst and subsequently reacting the resulting polymer containing active alkali metal end groups with a reagent which will couple the polymer molecules or replace the alkali metal with more stable reactive end groups. The utilization of these reactive terminal substituents on the polymer molecule enables substantially more effective cures since all of the molecule can be tied into the cross-linked structure. Also, by simple coupling arrangements, alone or with auxiliary curing, liquid polymers can be readily converted into solids and soft tacky rubber can be made quite rigid. The term "telechelic" has been coined to define these terminally reactive polymers. As used in this specification, telechelic polymers mean polymers of vinylidene-containing monomers which contain a reactive group on each end of the polymer molecule. By employing a suitable initiator polymers can be prepared which contain reactive groups on only one end of the polymer molecule in which case the term "semi-telechelic" is used to denote these polymers.

According to our invention a polymer is provided which contains reactive end groups of two types on at least one end of the polymer molecule. These terminally reactive polymers contain both hydroxy and epoxy groups which can be coupled and/or cross-linked by treatment with the appropriate reagents. For example, polyisocyanates react with the hydroxy groups and also with the epoxy groups on the polymer molecule, while polyamines can be used to couple the polymers through reactions involving the terminal epoxy groups. These polyfunctional, terminally-reactive polymers are prepared by reacting a polymer of a vinylidene-containing monomer, which polymer contains at least one terminal alkali metal atom per molecule, with a compound selected from the group consisting of polyepoxides, epoxy aldehydes, epoxy ketones, and epoxy esters. The alkali metal atom in the resulting polymer is then replaced with hydrogen atoms. The recovered polymer can be compounded with a polyfunctional agent alone or in combination with auxiliary curatives, such as sulfur compounds and peroxides, to form highly useful rubbery products having outstanding physical properties, particularly in modulus, tensile strength and heat build-up. The products of our invention can be used as adhesives, potting compounds, tread stocks, and also for manufacture of many types of molded objects.

It is an object of our invention to provide a method of preparing a polymer which contains terminal hydroxy and epoxy groups. Another object is to provide a polymer containing terminal epoxy and hydroxy groups which can be compounded and cured with polyfunctional compounds reactive with the hydroxy and/or epoxy groups. Another object is to provide a method of preparing a compounded rubbery stock which can be used in the manufacture of tire treads. Other objects, advantages and features of our invention will be apparent to those skilled in the art from the following discussion.

The polymers which contain terminally reactive alkali metal atoms can be prepared from a wide variety of monomers. The preferred monomers are the conjugated dienes containing from 4 to 12 carbon atoms per molecule and preferably 4 to 8 carbon atoms per molecule. Examples of these compounds include the following: 1,3-butadiene, isoprene, 2,3-dimethyl-1,3-butadiene, 1,3-pentadiene (piperylene), 3-methyl-1,3-pentadiene, 1,3-heptadiene, 3-butyl-1,3-octadiene, phenyl-1,3-butadiene and the like. Conjugated dienes containing halogen and alkoxy substituents along the chain can also be employed, such as chloroprene, fluoroprene, 2-methoxy-1,3-butadiene, 2-ethoxy-3-ethyl-1,3-butadiene, and 2-ethoxy-3-methyl-1,3-hexadiene. Conjugated dienes can be polymerized alone or in admixture with each other to form copolymers, or block copolymers. Block copolymers can be prepared from two or more conjugated dienes by charging one compound initially, allowing it to polymerize, and then adding a second conjugated diene and allowing it to polymerize. It is preferred that conjugated diolefins be employed in the practice of our invention and preferred monomers are butadiene, isoprene and piperylene.

In addition to the conjugated dienes we can practice our invention with other monomers containing a $CH_2=C<$ group such as the vinyl-substituted aromatic compounds. The vinyl-substituted aromatic compounds include styrene, 1-vinylnaphthalene, 2-vinylnaphthalene, and alkyl, cycloalkyl, aryl, alkaryl, aralkyl, alkoxy, aryloxy, and dialkylamino derivatives thereof in which the total number of carbon atoms in the combined substituents is generally not greater than 12. Examples of these aromatic monomers include: 3-methylstyrene(3-vinyltoluene), 4-n-propylstyrene, 4-dodecylstyrene, 4-cyclohexylstyrene, 2-ethyl-4-benzylstyrene, 4-p-tolylstyrene, 4-(4-phenyl-n-butyl)styrene, 4-methoxystyrene, 3,5-diphenoxystyrene, 4-dimethylaminostyrene, 4-methoxy-6-di-n-propylaminostyrene, 4,5-dimethyl-1-vinylnaphthalene, 8-phenyl-1-vinylnaphthalene, 4-methoxy-1-vinylnaphthalene, 3,6-dimethylamino-1-vinylnaphthalene, and the like. These vinyl-substituted aromatic compounds can be used to form homopolymers or copolymers including block copolymers with each other or with conjugated dienes. The presence of a small amount of polar compound such as the solvent used in preparing the initiator encourages random copolymerization between conjugated dienes and the vinyl-substituted aromatic compounds.

Certain polar monomers can also be polymerized to form homopolymers or copolymers with each other. These polar monomers can be employed to form block copolymers with conjugated dienes and/or vinyl-substituted aromatic compounds. When preparing these block copolymers the polar monomer is introduced after the non-polar monomers have polymerized. A detailed description of block copolymers containing terminal reactive groups and their method preparation is set forth in the copending application of R. P. Zelinski, Serial No. 796,277, filed March 2, 1959. These polar monomers include vinylpyridines and vinylquinolines in which the vinyl group is attached to a ring carbon other than a carbon in the beta position with respect to the nitrogen. These pyridine, quinoline or isoquinoline derivatives can contain substituents such as alkyl, cycloalkyl, aryl, alkaryl, aralkyl, alkoxy, aryloxy and dialkylamino groups in which the total number of carbon atoms in the combined substituents does not exceed 12. Any alkyl groups on the alpha or gamma carbons with respect to the nitrogen should be tertiary alkyl groups. Examples of polar monomers applicable include: 2-vinylpyridine, 3,5-diethyl-4-vinylpyridine, 3-n-dodecyl-2-vinylpyridine, 5 - cyclohexyl-2-vinylpyridine, 4-phenyl-2-vinylpyridine, 3 - benzyl-4-vinylpyridine, 6-methoxy-2 - vinylpyridine, 4 - phenoxy - 2 - vinylpyridine, 4-dimethylamino-2-vinylpyridine, 2 - vinylquinoline, 3-methyl-4-ethoxy - 2 - vinylquinoline, 3 - vinylisoquinoline, 4-phenyl - 1 - vinylisoquinoline and the like.

Other polar monomers include acrylic and alkacrylic acid esters, nitriles, and N,N-disubstituted amides, such as methyl acrylate, ethyl acrylate, butyl acrylate, methyl methacrylate, ethyl methacrylate, propyl methacrylate, butyl methacrylate, methyl ethacrylate, ethyl ethacrylate, isopropyl ethacrylate, acrylonitrile, methacrylonitrile, N,N-dimethylacrylamide, N,N - diethylmethacrylamide and the like. Vinylfuran and N-vinylcarbazole can also be used.

The terminally reactive polymers are prepared by contacting the monomer or monomers which it is desired to polymerize with an organo alkali metal compound. The organo alkali metal compounds preferably contain from 1 to 4 alkali metal atoms, and those containing 2 alkali metal atoms are more often employed. As will be explained hereinafter, lithium is the preferred alkali metal.

The organo alkali metal compounds can be prepared in several ways, for example, by replacing halogens in an organic halide with alkali metals, by direct addition of alkali metals to a double bond, or by reacting an organic halide with a suitable alkali metal compound. Ordinarily the initiator is prepared in a polar solvent such as an ether, for example, diethyl ether.

The organo alkali metal compound initiates the polymerization reaction, the organo radical ordinarily being incorporated in the polymer chain and the alkali metal being attached terminally at at least one end of the polymer chain. When employing polyalkali metal compounds an alkali metal is attached terminally at each end of the polymer chain. The polymers in general will be linear polymers having two ends; however, polymers containing more than two ends can be prepared within the scope of the invention. These polymers can be represented by the general formula $QM_n$ where Q comprises the polymer as previously described, M is an alkali metal and $n$ is an integer of 1 to 4.

The organo alkali metal initiators employed for preparing the polymers used in my invention can be represented by the formula $RM_x$ where R is a hydrocarbon radical selected from the group consisting of aliphatic, cycloaliphatic and aromatic radicals, M is an alkali metal including sodium, potassium, lithium, cesium and rubidium and $x$ is an integer of 1 to 4. The R in the formula generally contains from 1 to 20 carbon atoms although it is within the scope of the invention to use higher molecular weight compounds. By far the best results are obtained with organolithium compounds which give very high conversions to the terminally reactive polymer. Lithium is, therefore, the preferred alkali metal for the polymerization initiator. Examples of mono- and poly-alkali metal substituted hydrocarbons which can be employed for the polymerization initiator include methyllithium, n-butyllithium, n-decyllithium, phenyllithium, naphthyllithium, p - tolyllithium, cyclohexyllithium, 4 - butylphenylsodium, 4 - cyclohexylbutylpotassium, isopropylrubidium 4 - phenylbutylcesium, 1,4-dilithiobutane, 1,5 - dipotassiopentane, 1,4 - disodio-2-methylbutane, 1,10-dilithiodecane, 1,20-dilithioeicosane, 1,4 - dilithio - 2 - methyl-2-butene, 1,4-dipotassio-2-butene, dilithionaphthalene, 4,4'-dilithiobiphenyl, dilithioanthracene, 1,2 - dilithio - 1,1 - diphenylethane, 1,2-dilithio - 1,2-diphenylethane, 1,4 - dilithiocyclohexane, 1,3,5-trilithiocyclohexane, 1,4-dirubidiobutane, 1,8 - dicesiooctane, 1,5 - dilithio - 3 - pentyne, dilithiophenanthrene, 1,2 - dilithiotriphenylethane, dilithiomethane, and the like.

Certain specific initiators give better results than others and are preferred in carrying out preparation of the terminally reactive polymers. Lithium adducts of naphthalene, methylnaphthalenes, and anthracene give very good results. A preferred initiator is 1,2 - dilithio-1,2-diphenylethane (lithium-stilbene adduct). An initiator which is preferred for the formation of semitelechelic polymers is n-butyllithium. Other preferred initiators for the formation of telechelic polymers are the dilithium adducts of 2,3 - dialkyl-1,3-butadienes, 2,3-dimethyl-1,3-butadiene, and especially the dilithium adducts of isoprene and 1,3-butadiene wherein the adduct contains from 1 to 7 diene units per molecule.

The amount of initiator which can be used will vary depending on the polymer prepared, and particularly the molecular weight desired. Usually the terminally reactive polymers are liquids, having molecular weights in the range of 1000 to about 20,000. However, depending on the monomers employed in the preparation of the polymers and the amount of initiator used, semisolid and solid terminally reactive polymers can be prepared having molecular weights up to 150,000 and higher. Usually the initiator is used in amounts between about 0.25 and about 100 millimoles per 100 grams of monomer.

Formation of the terminally reactive polymers is generally carried out in the range of between −100 and +150° C., preferably between −75 and +75° C. The particular temperature employed will depend on both the monomers and the initiators used in preparing the polymers. For example, it has been found that the organolithium initiators provide more favorable results at elevated temperatures whereas lower temperatures are required to effectively initiate polymerization to the desired products with the other alkali metal compounds. The amount of catalyst employed can vary but is preferably in the range of between about 1 and about 40 millimoles per 100 grams of monomers. It is preferred that the polymerization be carried out in the presence of a suitable diluent which is predominantly hydrocarbon, such as benzene, toluene, cyclohexane, methylcyclohexane, xylene, n-butane, n-hexane, n-heptane, isooctane, and the like. Generally the diluent is selected from hydrocarbons, e.g., paraffins, cycloparaffins, and aromatics containing from 4 to 10 carbon atoms per molecule. It should be understood that relatively small amounts of other materials can be present, such as the ethers in which the initiator was dissolved, or a polar compound which is charged to encourage random copolymerization. As stated previously, the organolithium compounds are preferred as initiators in the polymerization reaction since a very large percentage of the polymer molecules formed contain two terminal reactive groups, and also the polymerization can be carried out at normal room temperatures. This is not to say, however, that other organo alkali metal initiators cannot be employed; however, usually more specialized operation or treatment is required with these materials, including low reaction temperatures.

Polymer chains resulting from the above-described process are terminated with 1 or more alkali metal atoms, preferably lithium atoms, depending upon the initiator employed. Without terminating the polymerization mixture or previously treating it in any way to remove the alkali metal atoms from the polymer, the polymer is then treated with a compound selected from the group consisting of polyepoxides, epoxy aldehydes, epoxy ketones and epoxy esters. These terminating agents are reacted with the alkali metal-containing polymer, in solution, preferably in the polymerization solvent, which is generally hydrocarbon. The terminating agents contain at least two functional groups, one of which is epoxy and the other is either epoxy or a carbonyl, as is present in an aldehyde or ketone, or a carbonyl as is present in an ester linkage. Any organic compound of this type can be used providing it is soluble in the polymer solution. Examples of suitable terminating agents include butadiene dioxide (1,2,3,4-diepoxybutane),
1,2,5,6-diepoxy hexane,
glycidaldehyde (2,3-epoxypropionaldehyde),
3,4-epoxybutyraldehyde,
3,4-epoxyvaleraldehyde,
1,2,4,5-diepoxy-3-pentanone,
1,2,4,5-diepoxy-3-hexanone, limonene dioxide, diepoxyethers of ethylene glycol such as bis-epoxydicyclopentyl ether of ethylene glycol and the corresponding thioethers, dicyclo-diepoxy carboxylates such as (2-methyl-4,5-epoxycyclohexyl)methyl 2-methyl-4,5-epoxycyclohexyl carboxylate,
1,2,5,6,9,10-triepoxydecane,
1,2,11,12-diepoxy-5,8-dioxadodecane,
1,2,9,10-diepoxy-4,7-dithiadecane,
1,2,16,17-diepoxy-6,9,12-trithiaheptadecane,
1,2,12,13-diepoxy-4,7,10-trioxahexadecane,
4,5,9,10-diepoxydecanal,
4,5,9,10,13,14-triepoxytetradecanal,
1,2,11,12-diepoxy-8-pentadecanone,
2,3,18,19-diepoxy-7,14-eicosanedione,
3,4-epoxybutyl 5,6-epoxyhexanoate,
5,6-epoxydecyl 5,6-epoxydecanoate, and the like.

Other types of functional groups can be present in these compounds provided they are less reactive than the epoxy or carbonyl groups present. Generally the compounds are hydrocarbons, ethers, thioethers, or esters containing the epoxy or epoxy and carbonyl groups.

The most convenient method of operation is to add the functional terminating agent to the unquenched polymer solution which is formed in the polymerization process. The temperature of treatment can vary from about −50° to 100° C., preferably from about 0 to 75° C. The reaction time is governed largely by the temperature, higher temperatures requiring shorter reaction periods, and can vary from 1 minute to as high as 80 hours or more, although there is seldom need to extend the reaction period beyond 20 or 25 hours.

The amount of bifunctional terminating agent can vary from 1 to 40 gram moles of epoxy or carbonyl group per gram atom of alkali metal present in the polymer. Smaller amounts of terminating agent promote coupling reactions whereas with larger amounts less coupling occurs. Coupling reactions result not only in polymer chains containing epoxy-hydroxy terminal groups but in hydroxy groups spaced at intervals along the polymer chain, i.e., at points where coupling has occurred.

When the terminating reagent is an epoxy aldehyde, ketone or ester, the alkali metal terminated polymer reacts with the carbonyl group and when coupling occurs the epoxy group undergoes reaction with more of the alkali metal terminated polymer. Whether or not coupling occurs, replacement of the alkali metal with hydrogen gives a hydroxy group. Similarly reaction of the alkali metal terminated polymers with polyepoxides can yield polymers with hydroxy groups along the polymer chain where coupling occurs as well as epoxy-hydroxy terminal groups. The alkali metal atoms can be replaced with hydrogen atoms by hydrolysis or reaction with a suitable reagent such as dilute mineral acids, glacial acetic acid, or other organic acids, alcohols or alcohol-water mixtures, such as methyl alcohol, ethyl alcohol solution, mixtures of alcohols and acids, and the like.

The products thus produced can be coupled and/or cured with various types of polyfunctional curatives which will react with the hydroxy and/or epoxy groups. The term "polyfunctional curatives" is intended to include compounds containing two or more functional groups. In general, these polyfunctional coupling agents include polyisocyanates, polybasic acids, acid anhydrides, polyamines, polybasic acid chlorides, and such compounds as chloromethylphosphonic dichloride. Polyisocyanates which contain two or more NCO groups can be used to react with either the hydroxy or epoxy terminal groups of the molecule. Where the polymer is prepared with a monoalkali metal initiator and contains reactive groups on only one end of the molecule the polyisocyanate produces coupling. Otherwise coupling and/or cross-linking can be effected by controlling the amount of polyisocyanate employed. Examples of suitable compounds of this type include benzene 1,3-diisocyanate, hexane 1,6-diisocyanate, tolylene 2,4-diisocyanate, tolylene 2,3-diisocyanate, diphenylmethane 4,4'-diisocyanate, naphthalene 1,5-diisocyanate, diphenyl 3,3'-dimethyl 4,4'-diisocyanate, diphenyl 3,3'-dimethoxy 4,4'-diisocyanate, 2,2'-diisocyanate diethyl ether, 3(diethylamino)pentane 1,5-diisocyanate, butane 1,4-diisocyanate, cyclohex-4-ene 1,2-diisocyanate, benzene 1,2,4-triisocyanate, naphthalene 1,3,5,7-tetraisocyanate, naphthalene 1,3,7-triisocyanate, and the like.

A suitable commercially available polyaryl polyisocyanate is known as PAPI–1. This material has an average of 3 isocyanate groups per molecule and an average molecular weight of about 380. Its general formula is:

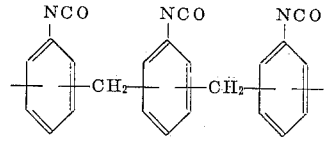

The polyisocyanates can be aliphatic, cycloaliphatic or aromatic compounds. Preferably the polyisocyanates are represented by the general formula $R(NCO)_m$ wherein R is a polyvalent organic radical containing from 2 to 30 carbon atoms and $m$ is 2, 3, or 4. R can be aliphatic, cycloaliphatic or aromatic. Also we prefer that the organic radical be essentially hydrocarbon in character although the presence of unreactive groups containing elements other than carbon and hydrogen is permissible.

Polybasic acids can be reacted with either the hydroxy or epoxy group of the polymer. Examples of such acids include maleic acid, pyromellitic acid, succinic acid, phthalic acid, terephthalic acid, trimellitic acid, and the lke. Acid anhydrides can also be reacted with either the hydroxy or epoxy groups, and examples of suitable anhydrides include maleic anhydride, pyromellitic dianhydride, and the like. Acid chlorides such as phthaloyl chloride, terephthalyl chloride and fumaryl chloride can be reacted with the hydroxy groups of the polymer as can such compounds as dichloromethylphosphonic dichloride, and the like. Polyamines can be used to react with the terminal epoxy groups. Examples of such polyamines include tetraethylenepentamine, ethylenediamine, diethylenetriamine, triethylenetetramine, o-phenylenediamine, 1,2-propanediamine, 1,2-butadiamine, 1,2,3-benzenetriamine, 3,3'-biphenyldiamine, and the like. Amine terminated polyamides such as can be produced by condensation of polyamines with polybasic acids can also be used. These polyfunctional organic coupling agents are preferably used in about stoichiometric amounts although slightly less than stoichiometric to amounts in substantial excess can be employed. Generally the amount of curative is in the range of about 80 percent to 150 percent stoichiometric, based upon either the hydroxy or epoxy content of the polymer. Temperatures anywhere within the range of −100 to 500° F. will produce curing reactions although preferred temperatures are in the range of 50 to 350° F. The time for curing can range anywhere from about 5 minutes to 100 hours or longer, depending upon the material being reacted and the temperature of the reaction. Ordinarily the curing is carried out after the polymer has been compounded with the coupling agent, reinforcing materials such as carbon black or mineral fillers, and an auxiliary curative such as organic peroxide. Mineral fillers used are those normally employed in compounding rubbery stocks such as silica, titanium dioxide, zinc oxide, calcium carbonate, zinc sulfide, calcium silicate, hydrated alumina, calcined magnesia and various types of clays. Filler loadings can vary over a wide range, for example between about 20 to 500 parts or higher of filler per 100 parts of polymer. If an auxiliary conventional curative is employed such as a sulfur compound or organic peroxide, the amount of such curative will ordinarily be in the range of about 0.05 to 5 parts by weight per 100 parts of polymer, preferably about 0.1 to 3 parts of curative per 100 parts of polymer.

Advantages of our invention will be more apparent from the following examples. The specific materials and conditions used in these examples are presented as being typical and should not be construed to limit our invention unduly.

*Example I*

The following recipe was employed for the polymerization of butadiene:

|  | Parts by weight |
|---|---|
| 1,3-butadiene | 100 |
| Cyclohexane | 780 |
| 1,2-dilithio-1,2-diphenylethane (20 mmoles) | 3.4 |
| Temperature, °F. | 122 |
| Time, hour | 1 |
| Conversion, percent | 100 |

The 1,2-dilithio-1,2-diphenylethane was prepared by the reaction of lithium with stilbene (1,2-diphenylethylene). The recipe was as follows:

|  | Parts by weight |
|---|---|
| Trans-stilbene (0.15 mole) | 27 |
| Lithium (0.50 mole) | 3.5 |
| Diethyl ether (450 ml.) | 321 |
| Tetrahydrofuran (50 ml.) | 44 |
| Temperature, °F. | 122 |
| Time, hours | 2 |
| Total alkalinity, N | 0.6 |

When carrying out the polymerization, cyclohexane was charged first after which the reactor was purged with nitrogen. Butadiene was added and then the 1,2-dilithio-1,2-diphenylethane. The temperature was regulated at 122° F. and after one hour the conversion was quantitative.

At the end of the polymerization the lithium telechelic polymer was treated with an excess of glycidaldehyde to convert the lithium terminal groups to epoxy-hydroxy terminal groups, the mole quantity of glycidaldehyde being approximately 20 times the initiator level. An instantaneous reaction occurred and a firm, gel-like product formed which fluidized rapidly at 122° F. The polymer solution was washed with water and the polymer was coagulated in isopropyl alcohol and dried in a vacuum oven after which 0.5 weight percent of 2,2′-methylene-bis(4-methyl-6-tert-butylphenol) was added as an antioxidant.

Five-gram samples of the epoxy-hydroxy telechelic polymer were blended with variable quantities of pyromellitic dianhydride, tetraethylenepentamine, and PAPI-1 (a polyaryl polyisocyanate with an equivalent weight of 138) as cross-linking agents. The compositions were placed in a forced air oven at 160° F. for three days. The following table shows types and amounts of cross-linking agents and results of curing as evidenced by gel formation:

CROSS-LINKING AGENT

| Run No. | Type | Amount [1] | Gel, Weight percent [2] |
|---|---|---|---|
| 1 | Pyromellitic dianhydride | 80 | >85 |
| 2 | do | 120 | >85 |
| 3 | Tetraethylenepentamine | 40 | >85 |
| 4 | do | 80 | >85 |
| 5 | do | 120 | >85 |
| 6 | PAPI-1 | 140 | >85 |

[1] Per cent based on initiator level (20 mmoles).
[2] Original sample was gel free.

*Example II*

Three rubbery butadiene/styrene random copolymers were prepared using 1,2-dilithio-1,2-diphenylethane as the initiator (see Example I). The recipes were as follows (parts by weight):

|  | Polymer A | Polymer B | Polymer C |
|---|---|---|---|
| 1,3-butadiene | 70 | 70 | 70 |
| Styrene | 30 | 30 | 30 |
| Cyclohexane | 1,200 | 780 | 780 |
| 1,2-dilithio-1,2-diphenylethane (mmole) | 1.4 | 1.4 | 1.2 |
| Tetrahydrofuran | 1.5 | 1.5 | 1.5 |
| Temperature, °F. | 122 | 122 | 122 |
| Time, hours | 3 | 2 | 2 |
| Conversion, percent | 100 | 100 | 100 |

Cyclohexane was charged first, the reactor was purged with nitrogen, and styrene, butadiene, tetrahydrofuran and the initiator were added in the order named. At the end of the polymerization, glycidaldehyde was added as in Example I to Polymer A and 37 mmoles of EP-201[1] to Polymer B and the reactions were continued for 16 hours at 122° F. The epoxy-hydroxy telechelic copolymers were recovered as in the preceding example. They had Mooney values (ML-4 at 212° F.) of 83 and 93, respectively. No terminating agent was added to Polymer C and a nontelechelic polymer having a Mooney value of 29 was recovered. The higher Mooney values of Polymers A

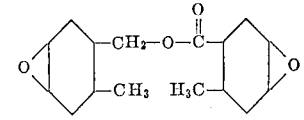

(2-methyl-4,5-epoxycyclo-hexyl)methyl 2-methyl-4,5-epoxycyclohexyl carboxylate.

and B indicate that some coupling occurred when the polymers were treated with the terminating agent.

The rubbery telechelic copolymers were compounded in a black-loaded recipe using dicumyl peroxide alone as a curative and dicumyl peroxide in conjunction with PAPI-1 and with tetraethylenepentamine. The stocks were cured at 307° F. and physical properties determined at 30 and 45 minute cures. Controls were run using Polymer C and a butadiene/styrene emulsion copolymer prepared at 41° F. This emulsion polymer, designated

[1] EP-201 is a dicyclo-diepoxy carboxylate.

as Polymer D, was nonfunctional and had a Mooney value of 104. Results were as follows:

COMPOUNDING RECIPES (PARTS BY WEIGHT)

| Run No. | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|
| Polymer A | 100 | 100 | 100 | 100 | 100 | | | | | | | | | | | |
| Polymer B | | | | | | 100 | 100 | 100 | 100 | 100 | | | | | | |
| Polymer C | | | | | | | | | | | 100 | | | | | |
| Polymer D | | | | | | | | | | | | 100 | 100 | 100 | 100 | 100 |
| Philblack O [1] | 50 | 50 | 50 | 50 | 50 | 50 | 50 | 50 | 50 | 50 | 50 | 50 | 50 | 50 | 50 | 50 |
| Di-Cup 40 C [2] | 1.5 | 1.25 | 1.5 | 1.25 | 2.5 | 1.5 | 1.25 | 1.5 | 1.25 | 2.4 | 2.0 | 1.5 | 1.0 | 1.0 | 2.5 | 2.5 |
| PAPI-1 | | 1.0 | 0.8 | | | | 1.0 | 0.8 | | | | | 1.0 | 0.8 | | |
| Tetraethylenepentamine | | | | 0.5 | 1.0 | | | | 0.5 | 1.0 | | | | | 1.0 | 0.5 |

PHYSICAL DATA (STOCKS CURED AT 307° F.)

| | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|
| 300% Modulus, p.s.i.: | | | | | | | | | | | | | | | | |
| 30 Minute cure | 1,660 | 1,740 | 2,300 | 2,360 | 2,420 | 1,600 | 1,600 | 2,160 | 1,440 | 1,620 | 1,220 | 1,460 | 1,640 | 1,620 | 860 | 1,980 |
| 45 Minute cure | 2,060 | 2,200 | 2,980 | 2,480 | 2,460 | 2,000 | 1,960 | | 1,540 | 1,580 | 1,600 | 1,760 | 2,020 | 1,840 | 1,040 | 1,800 |
| Tensile, p.s.i.: | | | | | | | | | | | | | | | | |
| 30 Minute cure | 3,040 | 3,440 | 3,560 | 3,660 | 3,840 | 2,400 | 3,160 | 3,400 | 2,680 | 3,160 | 1,760 | 3,060 | 2,760 | 2,740 | 2,860 | 2,020 |
| 45 Minute cure | 2,740 | 3,540 | 3,420 | 4,260 | 2,960 | 2,400 | 3,100 | | 2,740 | 3,320 | 1,940 | 3,000 | 3,180 | 2,920 | 2,460 | 2,320 |
| Elongation, percent: | | | | | | | | | | | | | | | | |
| 30 Minute cure | 430 | 470 | 420 | 415 | 420 | 400 | 500 | 420 | 470 | 495 | 405 | 480 | 450 | 470 | 620 | 310 |
| 45 Minute cure | 350 | 420 | 340 | 460 | 360 | 360 | 420 | | 460 | 540 | 400 | 420 | 430 | 460 | 525 | 370 |
| ΔT, ° F.: | | | | | | | | | | | | | | | | |
| 30 Minute cure | 80.1 | 83.3 | 71.6 | 65.9 | 70.9 | 70.3 | 70.6 | 66.6 | 76.0 | 74.7 | 93.8 | 71.3 | 84.0 | 88.7 | 101.5 | 71.6 |
| 45 Minute cure | 69.9 | 71.3 | 63.5 | 62.5 | 71.6 | 65.9 | 65.2 | 58.5 | 75.3 | 75.3 | 81.4 | 64.5 | 74.0 | 76.0 | 94.8 | 64.2 |
| Resilience, percent: | | | | | | | | | | | | | | | | |
| 30 Minute cure | 69.9 | 70.7 | 73.2 | 72.5 | 74.0 | 70.2 | 71.6 | 71.2 | 72.1 | 72.2 | 66.2 | 63.7 | 61.9 | 60.4 | 57.3 | 63.7 |
| 45 Minute cure | 71.1 | 70.1 | 71.1 | 72.0 | 73.0 | 71.2 | 71.8 | 73.0 | 71.8 | 72.2 | 67.0 | 65.5 | 63.3 | 63.2 | 58.0 | 66.4 |
| Shore A Hardness: | | | | | | | | | | | | | | | | |
| 30 Minute cure | 68.5 | 70.5 | 71 | 69 | 70 | 69 | 69 | 71 | 69 | 69.5 | 70 | 61 | 64 | 64 | 60 | 62.5 |
| 45 Minute cure | 69 | 70.5 | 72 | 69.5 | 71 | 70 | 70.5 | 71.5 | 69 | 70.5 | 71.5 | 62.5 | 66 | 67 | 69.5 | 64 |

[1] High abrasion furnace black.
[2] A product containing 40 percent active dicumyl peroxide and 60 percent precipitated $CaCO_3$.

There was a significant increase in modulus and tensile strength, and a reduction in heat build-up, in compositions containing the telechelic polymer whereas opposite trends were observed with the emulsion copolymer control (nontelechelic polymer).

*Example III*

Butadiene was polymerized in a series of runs using variable amounts of 1,2-dilithio-1,2-diphenylethane as the initiator but otherwise the recipe of Example I was employed. Polymerizations were conducted at 122° F. and quantitative conversion was reached in all runs in 1.5 hours.

Following polymerization an excess of a diepoxide was added (approximately 20 times the initiator level). In addition to EP-201, diepoxides employed were the following commercially available materials:

AG-13E (bis-epoxydicyclopentyl ether of ethylene glycol)

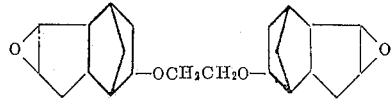

Limonene dioxide

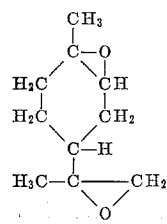

Products were recovered as in Example I and inherent viscosity measured. Results were as follows:

| Run No. | Initiator Level, millimoles | Diepoxide Terminating Agent | Inherent Viscosity |
|---|---|---|---|
| 1 | 30 | AG-13E | 0.41 |
| 2 | 20 | AG-13E | 0.40 |
| 3 | 30 | Limonene dioxide | 0.14 |
| 4 | 30 | EP-201 | 0.24 |
| 5 | 20 | EP-201 | 0.51 |

Difference in inherent viscosity of the products indicates that more or less coupling occurred when the diepoxy compounds reacted with the lithium telechelic polymer. Terminal groups contained both epoxy and hydroxy groups.

Variable quantities of different cross-linking agents were blended with each of epoxy-hydroxy telechelic polymers, the compositions were placed in a forced air oven at 160°

F. for three days, and inherent viscosity and gel were determined. Results were as follows:

| Polymer No. | Diepoxide Terminating Agent | Cross-linking Agent | | Inherent Viscosity [2] | Gel, percent |
|---|---|---|---|---|---|
| | | Type | Amount [1] | | |
| 1 | AG-13E | PAPI-1 | 100 | 0.58 | 72 |
| 1 | AG-13E | PAPI-1 | 200 | 0.38 | 73 |
| 1 | AG-13E | Nacconate 80 [3] | 100 | 0.32 | 64 |
| 1 | AG-13E | Nacconate 80 | 200 | 0.40 | 70 |
| 2 | AG-13E | PMDA [4] | 120 | 0.54 | 42 |
| 3 | Limonene dioxide | PAPI-1 | 160 | 0.34 | 37 |
| 4 | EP-201 | PAPI-1 | 110 | 0.27 | 40 |
| 4 | EP-201 | PAPI-1 | 160 | 0.32 | 43 |
| 4 | EP-201 | Nacconate 80 | 160 | 0.27 | 43 |
| 4 | EP-201 | PMDA | 110 | 0.19 | 51 |
| 5 | EP-201 | PAPI-1 | 140 | ---------- | >85 |
| 5 | EP-201 | Nacconate 80 | 90 | 0.16 | 77 |
| 5 | EP-201 | PMDA | 80 | ---------- | >85 |
| 5 | EP-201 | PMDA | 120 | ---------- | >85 |

[1] Percent based on initiator level.
[2] Determined on soluble portion.
[3] A mixture of 80 percent 2,4-tolylene diisocyanate and 20 percent 2,6-tolylene diisocyanate.
[4] Pyromellitic dianhydride.

The data show that considerable cross-linking occurred as evidenced by gel content.

*Example IV*

In order to show that diepoxides serve both as terminating and coupling agents, butadiene was polymerized in a series of runs in the presence of 1,2-dilithio-1,2-diphenylethane as the initiator and the reaction mixtures were treated with the diepoxides, AG-13E and EP-201. The polymerization recipe was as follows:

| | Parts by weight |
|---|---|
| 1,3-butadiene | 100 |
| Toluene | 860 |
| 1,2-dilithio-1,2-diphenylethane | Variable |
| Temperature, °F. | 122 |
| Time, hours | 2 |
| Conversion, percent | 100 |

Toluene was charged first and the reactor was then purged with nitrogen. Butadiene was added and then then the initiator. A control sample was removed after polymerization was completed and the remainder of the reaction mixture was treated with a diepoxide as a terminating agent. A summary of the runs is shown in the following table:

| Run No. | Initiator Level, Mmoles | Diopoxide | | Inherent Viscosity | Gel, percent |
|---|---|---|---|---|---|
| | | Type | Mmoles | | |
| 1 | 3 | ---------- | ---------- | 1.14 | 0 |
| 1A | 3 | AG-13E | 3.3 | 1.30 | 0 |
| 2 | 10 | ---------- | ---------- | 0.38 | 0 |
| 2A | 10 | AG-13E | 11 | 0.52 | 0 |
| 3 | 3 | ---------- | ---------- | 0.84 | 0 |
| 3A | 3 | EP-201 | 6 | 1.08 | 0 |
| 4 | 15 | ---------- | ---------- | 0.23 | 0 |
| 4A | 15 | EP-201 | 30 | 0.33 | 0 |

The increase in inherent viscosity in the runs in which diepoxides were used indicates that coupling occurred.

As will be apparent to those skilled in the art, various modifications can be made in our invention without departing from the spirit or scope thereof.

We claim:

1. A process for producing polymers having both terminal epoxy and hydroxy groups which comprises reacting a polymer of a conjugated diene having from 4 to 12 carbon atoms per molecule, said polymer containing at least one terminal alkali metal atom per molecule with a compound selected from the group consisting of epoxy aldehydes, epoxy ketones, and epoxy esters, and replacing the lithium atoms in the resulting polymer with hydrogen atoms, said compound being present in an amount of from 1 to 40 gram mols of carbonyl group per gram atom alkali metal in said polymerizate.

2. A process for producing polymers having terminal reactive groups which comprises reacting a polymer of a conjugated diene having from 4 to 12 carbon atoms per molecule, said polymer containing at least one terminal lithium atom per molecule, with a compound selected from the group consisting of epoxy aldehydes, epoxy ketones, and epoxy esters, and replacing the lithium atoms in the resulting polymer with hydrogen atoms to produce a polymer containing both terminal epoxy and hydroxy groups, said compound being present in an amount of from 1 to 40 gram mols of carbonyl group per gram atom of lithium in said polymer containing at least one terminal lithium atom per molecule.

3. The process of claim 2 wherein said conjugated diene polymer contains from 2 to 4 terminal lithium atoms per molecule.

4. The process of claim 3 wherein said polymer is a butadiene-styrene copolymer and said compound is (2-methyl-4,5-epoxycyclohexyl)methyl 2-methyl-4,5-epoxycyclohexyl carboxylate.

5. A process for producing a polymeric material which comprises reacting a polymer of a conjugated diene having from 4 to 12 carbon atoms per molecule, said polymer containing at least one terminal alkali metal atom per molecule with a compound selected from the group consisting of epoxy aldehydes, epoxy ketones, and epoxy esters, replacing the alkali metal atoms in the resulting polymer with hydrogen, to produce a polymer having both terminal epoxy and hydroxy groups, said compound being present in an amount of from 1 to 40 gram mols of carbonyl group per gram atom of alkali metal in said polymerizate, and curing the resulting polymer with a polyfunctional organic curative which is reactive with at least one of the terminal hydroxy and epoxy groups of said polymer.

6. A process for producing a polymeric material which comprises reacting a polymer of a conjugated diene containing 4 to 12 carbon atoms per molecule, said polymer having been formed in a hydrocarbon solvent and having from 2 to 4 terminal lithium atoms per molecule, with a terminating agent soluble in said solvent and selected from the group consisting of epoxy aldehydes, epoxy ketones, and epoxy esters, said compound being present in an amount of from 1 to 40 gram atoms of carbonyl group per gram atom of lithium in said polymer, replacing the lithium atoms in the resulting polymer with hydrogen atoms, recovering said polymer from said solution, and reacting the resulting polymer containing terminal epoxy and hydroxy groups with a curative selected from the group consisting of polyisocyanates, polybasic acids, polybasic acid chlorides, acid anhydrides, polyamines and chloromethylphosphonic dichloride.

7. The process of claim 6 wherein said polymer containing terminal hydroxy and epoxy groups is compounded with material selected from the group consisting of carbon black and mineral filler prior to reacting with said polyfunctional organic curative.

8. The process of claim 6 wherein said compounded stock is cured in the presence of an organic peroxide as an auxiliary curative.

9. The process of claim 14 wherein said polymer is polybutadiene and said polyfunctional curative is tetraethylenepentamine.

10. The process of claim 6 wherein said polymer is polybutadiene, said terminating agent is (2-methyl-4,5-epoxycyclohexyl)methyl 2-methyl - 4,5-epoxycyclohexyl carboxylate, and said polyfunctional curative is tolylene diisocyanate.

11. The process of claim 14 wherein said polymer is a homopolymer of 1,3-butadiene and said curative is pyromellitic dianhydride.

12. The process of claim 14 wherein said polymer is a homopolymer of 1,3-butadiene and said curative is a polyaryl polyisocyanate having an average of 3 isocyanate groups of molecule and an average molecular weight of about 380.

13. The process of claim 6 wherein said polymer is a homopolymer of 1,3-butadiene and said curative is a polyaryl polyisocyanate plus pyromellitic dianhydride.

14. A process for producing a polymeric material which comprises reacting a polymer of a conjugated diene containing 4 to 12 carbon atoms per molecule, said polymer having been formed in a hydrocarbon solvent and having from 2 to 4 terminal lithium atoms per molecule, with from 1 to 40 gram mols of glycidaldehyde per gram atom of lithium in said polymer, replacing the lithium atoms in the resulting polymer with hydrogen atoms, recovering said resulting polymer having both terminal epoxy and hydroxy groups and reacting said resulting polymer with a curative selected from the group consisting of polyisocyanates, polybasic acids, polybasic acid chlorides, acid anhydrides, polyamines and chloromethylphosphonic dichloride.

15. A process for producing polymers having terminal reactive groups which comprises: reacting a polymer of butadiene containing from 2 to 4 terminal lithium atoms per molecule with from 1 to 40 gram mols of glycidaldehyde per gram atom of lithium in said polymer, and replacing the lithium atoms in the resulting polymer with hydrogen atoms to produce a polymer containing both terminal epoxy and hydroxy groups.

16. The polymer product made by the process of claim 1.

17. The polymer product made by the process of claim 11.

18. The polymer product made by the process of claim 13.

19. The polymeric product made by the process of claim 5.

20. The polymer product made by the process of claim 15.

References Cited by the Examiner

UNITED STATES PATENTS

| | | | |
|---|---|---|---|
| 3,036,045 | 5/1962 | Short et al. | 260—41.5 |
| 3,055,952 | 9/1962 | Goldberg | 260—77.5 |
| 3,135,716 | 6/1964 | Uraneck et al. | 260—45.5 |

MORRIS LIEBMAN, *Primary Examiner.*

K. B. CLARKE, J. S. WALDRON, *Assistant Examiners.*